US008135860B1

(12) United States Patent
Brown et al.

(10) Patent No.: US 8,135,860 B1
(45) Date of Patent: Mar. 13, 2012

(54) CONTENT INTERPOLATING WEB PROXY SERVER

(75) Inventors: Michael Kenneth Brown, North Plainfield, NJ (US); Biing-Hwang Juang, Warren, NJ (US)

(73) Assignee: Alcatel Lucent, Paris (FR)

( * ) Notice: Subject to any disclaimer, the term of this patent is extended or adjusted under 35 U.S.C. 154(b) by 3777 days.

(21) Appl. No.: 09/620,495

(22) Filed: Jul. 20, 2000

(51) Int. Cl.
*G06F 15/16* (2006.01)
(52) U.S. Cl. ......... 709/246; 709/203; 709/217; 709/224
(58) Field of Classification Search .................. 709/217, 709/219, 229, 203, 227, 246, 249, 223–226, 709/220; 707/104.1; 705/26
See application file for complete search history.

(56) References Cited

U.S. PATENT DOCUMENTS

| 5,727,159 | A  | * | 3/1998  | Kikinis .......................... | 709/246 |
| 5,918,013 | A  | * | 6/1999  | Mighdoll et al. ............. | 709/217 |
| 6,014,638 | A  | * | 1/2000  | Burge et al. ................... | 705/26  |
| 6,157,924 | A  | * | 12/2000 | Austin ............................ | 707/10  |
| 6,167,441 | A  | * | 12/2000 | Himmel ........................ | 709/217 |
| 6,216,159 | B1 | * | 4/2001  | Chintakrindi et al. ........ | 709/220 |
| 6,247,048 | B1 | * | 6/2001  | Greer et al. .................... | 709/219 |
| 6,292,185 | B1 | * | 9/2001  | Ko et al. ........................ | 345/763 |
| 6,332,131 | B1 | * | 12/2001 | Grandcolas et al. ........... | 705/35  |
| 6,345,279 | B1 | * | 2/2002  | Li et al. .......................... | 709/217 |
| 6,421,733 | B1 | * | 7/2002  | Tso et al. ....................... | 709/217 |
| 6,442,529 | B1 | * | 8/2002  | Krishan et al. ................. | 705/14  |
| 6,626,958 | B1 | * | 9/2003  | McCauley et al. ............. | 715/517 |

FOREIGN PATENT DOCUMENTS

| GB | 2 344 197 A | 5/2000 |
| JP | 2000-90001  | 3/2000 |

OTHER PUBLICATIONS

Curtis K., Draper O., Multimedia Content Management-Provision of Validation and Personalisation Services, Jul. 1999, IEEE: Multimedia Computing and Systems, vol. 2 pp. 302-306.*
Mohan R., Smith J.R., Content Adaptation Framework, IEEE: Global Telecommunications Network, 1999, vol. 4 pp. 2015-2021.*
Bharadvaj H., Joshi A., An Active Transcoding Proxy to Support Mobile Web Access, IEEE Symposium: Reliable Distributed Systems, Oct. 1998, pp. 118-123.*

(Continued)

*Primary Examiner* — Ramy M Osman
(74) *Attorney, Agent, or Firm* — Ryan, Mason & Lewis, LLP

(57) ABSTRACT

A content interpolating web proxy server is configured in a computer network for processing retrieved web content so as to place it in a format suitable for presentation on a particular client device such as, e.g., a computer, personal digital assistant (PDA), wireless telephone or voice browser-equipped device. The server processes a client request generated by a client device to determine a particular client type associated with the client device, retrieves web content identified in the client request, retrieves one or more augmentation files associated with the web content and the particular client type, and alters the retrieved web content in accordance with the one or more augmentation files. The altered web content is then delivered to the client device. The one or more augmentation files may be co-located with the web content at a site remote from the proxy server, such that the content owner need not own, maintain or otherwise control the proxy server.

18 Claims, 3 Drawing Sheets

OTHER PUBLICATIONS

Mohan R., Smith J.R., Adapting Multimedia Internet Content for Universal Access, IEEE Transactions on Multimedia, Mar. 1999, vol. 1 issue 1 pp. 104-114.*

S. Acharya et al., "Systematic Multiresolution and its Application to the World Wide Web," Proc. Intl. Conf. on Data Engineering, Sydney, Australia, pp. 1-10, Mar. 1999.

Spyglass Prism 3.0, Content Delivery and Transformation Platform, http://www.spyglass.com/solutions/technologies/prism, 6 pages, 1999.

PhoneBrowser, http://www.phonebrowser.com, pp. 1-2, Jul. 17, 2000.

* cited by examiner

CONTENT INTERPOLATING WEB PROXY SERVER

FIELD OF THE INVENTION

The present invention relates generally to the Internet and other computer networks, and more particularly to techniques for communicating information over such networks via a proxy server.

BACKGROUND OF THE INVENTION

Conventional web proxy servers may be configured to provide transformation of web pages or other types of web content for delivery over the Internet or other computer networks. For example, a number of so-called transcoding web proxy servers currently exist as products to transform web content by the application of appropriately-designed filtering mechanisms.

One such transcoding web proxy server is the NetBlitz proxy server from Lucent Technologies of Murray Hill, N.J. The NetBlitz server is described in greater detail in, e.g., S. Acharya, H. F. Korth and V. Poosala, "Systematic Multiresolution and its Application to the World Wide Web," Proc. Intl. Conf. on Data Engineering, Sydney, Australia, March 1999, which is incorporated by reference herein. The NetBlitz server is designed to compress content so as to allow more rapid transmission of the content through a network. However, the NetBlitz solution is focused primarily on data compression and typically does not delete, edit or otherwise alter information content.

Another known web proxy server is the Spyglass Prism proxy server, described at http://www.spyglass.com/solutions/technologies/prism. This server uses a Document Object Model (DOM) to represent the structure of a web page, and a template to describe the web content to be extracted and modified. A significant disadvantage of the Spyglass Prism approach is that the DOM and template reside on the proxy server itself. This makes it necessary for the content provider to own or to control the proxy server in order to keep the templates synchronized with changes in web content. Moreover, the DOM and template formats are sufficiently complicated that specially trained personnel typically hand craft these modules for proxy customers.

It is therefore apparent that a need exists for an improved web proxy server which is able to interpolate web content so as to support a wide variety of different clients in an efficient manner, without requiring the content provider to own or control the web proxy server.

SUMMARY OF THE INVENTION

The present invention provides a content interpolating web proxy server for use in processing web pages or other web content for delivery over the Internet or other computer networks. In accordance with one aspect of the invention, a content interpolating web proxy server is configured in a computer network for processing retrieved web content so as to place it in a format suitable for presentation on particular client devices such as, e.g., computers, personal digital assistants (PDAs), wireless telephones and voice browsers.

In operation, the proxy server processes a client request generated by a client device to determine a particular client type associated with the client device, retrieves web content identified in the client request, retrieves one or more augmentation files associated with the web content and the particular client type, and alters the retrieved web content in accordance with the one or more augmentation files. The altered web content is then delivered to the client device. Advantageously, the one or more augmentation files may be co-located with the web content at a site remote from the proxy server, such that the content owner need not own, maintain or otherwise control the proxy server.

In accordance with another aspect of the invention, the proxy server alters the retrieved web content by first parsing the web content into one or more component structures, and then applying a pattern matching process to recognize designated component structures subject to alteration in accordance with one or more of the augmentation files. The pattern matching process in an illustrative embodiment may utilize a pattern matching expression which includes context, pattern, precedence and replacement elements. The context element may be a structure scope constraining expression containing one or more instructions of the form pattern:replacement, each specifying a particular replacement from one of the augmentation files to be implemented upon detection of the corresponding pattern. The precedence element specifies an order of application of the instructions associated with the context element.

In accordance with a further aspect of the invention, a given client request received by the interpolating proxy server may be associated with a number of different client devices, and the retrieved augmentation files may include one or more augmentation files for each of the different client devices.

Advantageously, a content interpolating web proxy server in accordance with the invention can be configured to provide multiple interpretations of web content based on client type. In addition, the invention separates control of interpolation scripts from the interpolating proxy server platform so that content providers have full control of all aspects of content while not needing control of the interpolating proxy server itself. This allows the proxy server to be located remotely, e.g., as a generalized service provided by an Internet service provider (ISP) and made simultaneously available to multiple content providers. Moreover, the content interpolating web proxy server also takes better advantage of semantic information present in HyperText Mark-up Language (HTML) and Extensible Mark-up Language (XML) documents as well as other types of web content. Furthermore, the invention can be used to perform protocol conversion under the direction of remote interpolation scripts, e.g., to provide service conversion to Wireless Access Protocol (WAP)-enabled devices.

DETAILED DESCRIPTION OF THE INVENTION

The present invention will be illustrated below in conjunction with exemplary processing systems. It should be understood, however, that the invention is not limited to use with any particular type of system, network, network communication protocol or configuration. The term "web content" as used herein is intended to include one or more documents, files, web pages or any other type or arrangement of information accessible over the World Wide Web, over other portions of the Internet, or over other types of communication networks. The term "processing system" as used herein is intended to include any type of computer-based system or other type of system which comprises one or more hardware or software elements configured to provide one or more of the content interpolation functions described herein. The term "server" as used herein is intended to include both a single server device or system as well as sets or other groupings or arrangements of multiple server devices or systems.

Figure 1:
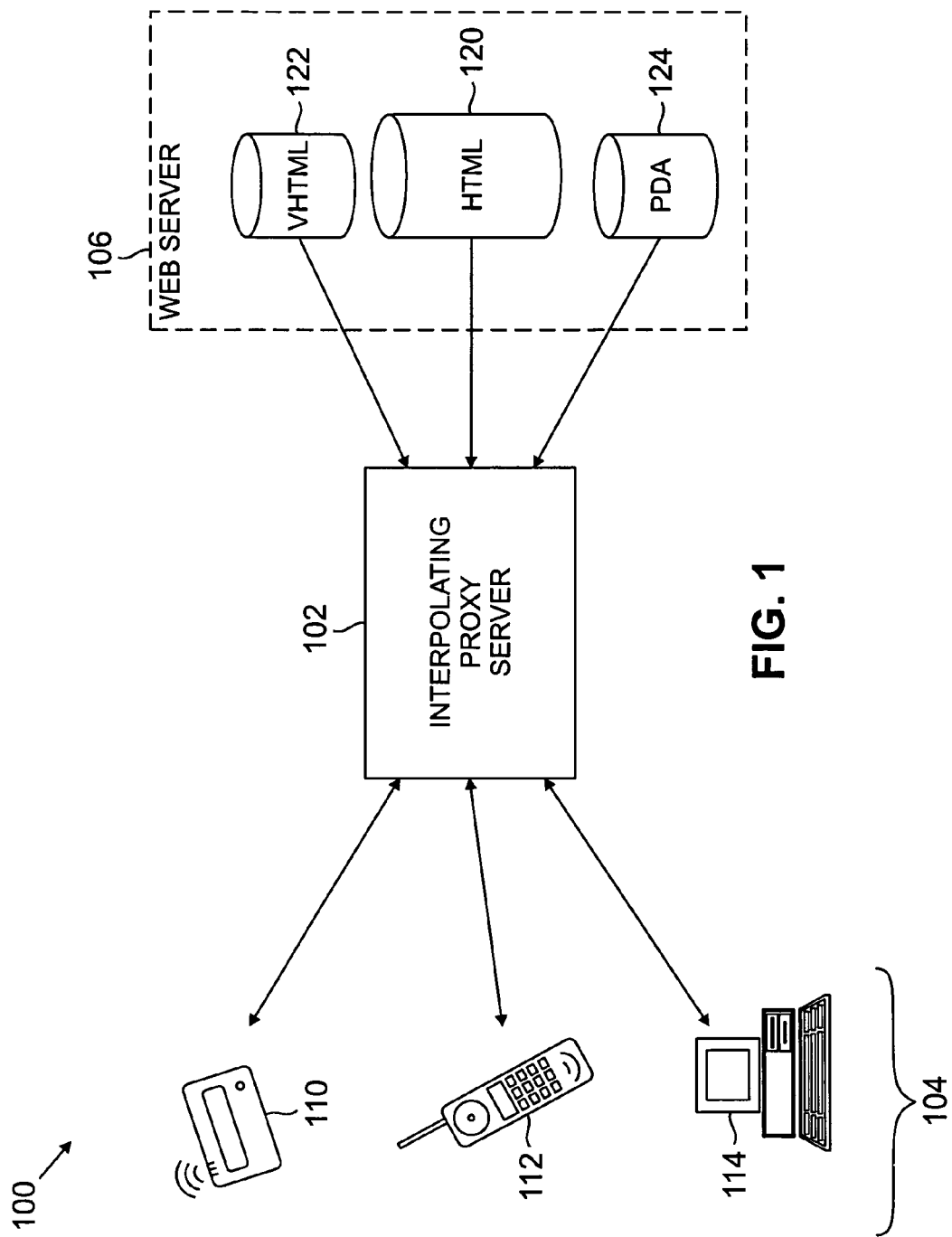
FIG. 1 is a block diagram of an illustrative processing system which includes a content interpolating proxy server in accordance with the present invention.

FIG. 1 shows an illustrative embodiment of a web-based processing system 100 in accordance with the present invention. The system 100 includes an interpolating proxy server 102 which is configured to support communications between a set of client devices 104 and a web server 106. The set of client devices 104 in this embodiment include a personal digital assistant (PDA) 110, a wireless telephone 112 and a personal computer 114. The web server 106 includes a number of web content databases, including a HyperText Mark-up Language (HTML) database 120, a voice-augmented HTML (VHTML) database 122, and a PDA database 124. It should be understood that the client devices 104 and the databases of the web server 106 are examples only, and the invention can be used with numerous other types and arrangements of devices and databases. Moreover, although only a single web server 106 is shown in the figure, the interpolating proxy server 102 can of course interface with multiple web servers.

The proxy server 102 is referred to in conjunction with the illustrative embodiments as an "interpolating" proxy server. It should be understood that the term "interpolating" as used herein is intended to include operations such as transcoding or translation, as well as other types of processing operations involving web content.

The various client and server elements of the system 100 are assumed to communicate via conventional network connections, e.g., a connection established over a network in a conventional manner using the Transmission Control Protocol/Internet Protocol (TCP/IP) standard or other suitable communication protocol(s).

Although the operation of the system 100 is described herein with reference to HTML and Extensible Mark-up Language (XML), the invention can be implemented in conjunction with other web content languages. The voice-augmented HTML referred to herein may be, e.g., Phone Markup Language (PML), Voice eXtensible Markup Language (VoiceXML), Speech Markup Language (SpeechML), Talk Markup Language (TalkML), etc. It should be noted that various evolving web-based voice browser language proposals are now being considered by the World Wide Web Consortium (W3C) Voice Browser Working Group. These emerging standards may influence the particular implementation details associated with a given embodiment of the invention.

In accordance with the invention, the interpolating proxy server 102 is able to identify the type of client with which it is communicating, and to interpolate web content to be delivered from the web server 106 to that client such that the content is presented in a format appropriate to the particular client device. For example, HTML content associated with an accessed web site may be interpolated in accordance with voice-augmented HTML information so as to provide an appropriate voice interface to the web content via the wireless telephone 112, or interpolated in accordance with PDA-augmented information so as to provide an appropriate PDA interface to the web content via the PDA 110.

The interpolating proxy server 102 can identify the client device type using any of a number of different techniques, such as, e.g., HyperText Transfer Protocol (HTTP) User_Agent and Content_Type protocol headers, client-identifying "cookies," or HTTP GET request QUERY_STRING attributes. Once identified, a particular client type is associated with an auxiliary content file type that is designated by a file name extension. These auxiliary content files are also referred to herein as patch files or more generally as augmentation files.

By way of example, a PhoneBrowser client may identify itself by specifying User_Agent: PhoneBrowser/2.3 in the HTTP header. This causes the interpolating proxy server 102 to look for both an original HTTP GET requested file (e.g., File.html) and an associated interpolation script or augmentation file (e.g., File.vhtml). Additional details regarding PhoneBrowser may be found at, e.g., http://www.phonebrowser.com.

As another example, a PDA augmentation file can be identified as File.pda. Each client type can have a corresponding augmentation file co-located on its corresponding web site. Augmentation files are typically smaller than original HTML content files. The term "augmentation file" as used herein is intended to include an interpolation script, auxiliary content file, patch file or any other type of information which defines a translation, alteration or other type of interpolation for at least a portion of a requested piece of web content.

Additional details regarding the processing of HTML or other types of web content to generate voice information may be found in U.S. patent application Ser. No. 09/168,405, filed Oct. 6, 1998 in the name of inventors M. K. Brown et al. and entitled "Web-Based Platform for Interactive Voice Response," which is incorporated by reference herein.

Server-side control aspects of the system 100 will now be described in greater detail. Server-side editing and other interpolation processes implemented by the interpolating proxy server 102 may be performed in a manner similar to the patch facility commonly used in updating UNIX source code, for which many supporting tools are known in the art. The basic patch facility operates by identifying target file line numbers and input patterns to be searched. When an input pattern matches a character string, a corresponding output script is inserted as replacement. This approach is suitable for source code patching, and could be used for an editing process implemented in the interpolating proxy server.

In addition to the above-described patching capability that replaces a pattern with a new string, transformations on the text can be computed using any one of variety of suitable programming languages to create patching functions. Such patching functions can modify a target web page and aggregate content from several other pages of HTML or other web content to produce a single virtual page. Possible uses of the patching functions include summarization of a web site, or subset of a web site, into a single summary page.

The interpolating proxy server 102 can also fragment a single web page into several virtual pages that can then be aggregated with other web pages, in whole or in part, to produce a constructed virtual web page or pages. This can be accomplished by configuring the interpolating proxy server to intercept QUERY_STRING parameters that specify the virtual page contents. The interpolating proxy server then constructs a virtual page based on the instructions from the QUERY_STRING by aggregation or fragmentation of the set of web pages from one or more web sites. The instructions can make reference to one or more program files on a local or remote server to be executed for actual construction of the virtual page or pages.

The above-described aggregation or fragmentation capability not only provides a useful web document summarization feature, but can also be used to transform implementations in one web language to another web language even in situations in which the direct mapping between the languages is not one-to-one. For example, a VoiceXML implementation of a given web site may contain several dialogue turns per web page, while a corresponding HTML implementation of the web site may contain more web pages with only one dialogue turn per page. The above-described proxy aggregation capability can be used to transform the HTML implementation into a VoiceXML implementation, and the proxy fragmentation capability can be used to transform the VoiceXML implementation into an HTML implementation.

The above-described simple constrained string match and replace mechanism can be modified for improved processing of HTML, XML or other types of Mark-up Language (ML) documents, in the following manner. Initially, an original ML document is fully parsed into component structures. A pattern matcher is then used to recognize known ML structures that are represented concisely in augmentation scripts with special tokens. This approach is particularly well suited to searching through XML structures for information that may not always appear at the same position on a web page. Since ML is not record-oriented, parsed ML structure may be used for constraints in place of line number constraints. Embedded substructures may be handled in a recursive manner. Such structures establish the scope of pattern matching.

Within a given parsed structure, tag patterns and string patterns can be matched by regular expressions of tokens within a structured context. A token can be a character string, HTML tag, XML tag, tag sequence, etc. Replacement patterns are expressed using similar tokens. Details of the replacement pattern matching syntax will depend upon the specification of the particular markup language being used.

An example pattern matching expression includes context, pattern, precedence and replacement elements. The context element is a structure scope constraining expression that can contain one or more pattern:replacement instructions. The order of the pattern:replacement instructions dictates the precedence or order of application. Typically, the most specific, i.e., longest, pattern matches take highest precedence. Instructions can be contained within specified delimiters (e.g., curly brackets) with designated prefix symbols (e.g., "?") to indicate a limit of zero or one instruction application per pattern match within the instruction scope. Otherwise, all matching instructions are applied in precedence order.

The context can be as simple as an HTML context such as <BODY> and </BODY> constructs. Convenient notation for specifying contexts can be provided by an interpreter that has knowledge of the scoping characteristics of all HTML tags. Contexts, as well as pattern instructions, can be embedded within other contexts, thereby providing a compact expression for an entire document.

A mechanism can be provided in the interpolating proxy server 102 for modification or replacement of HTTP header information. For example, the value of the User_Agent parameter can be changed by proxy transcoding to permit client masquerading. HTTP cookies can be modified in both transmission of requests and reception of server data. When used in combination with a user profile assigned to each identifiable client, devices that cannot support HTTP cookies can be made to operate as if they had cookie support. Client identification can be obtained from a variety of information sources, including the REMOTE_USER HTTP parameter or by user login. In this way the interpolating proxy server 102 can supply cookie transactions for clients of limited capabilities, such as palm-top devices.

The interpolating proxy server 102 can enable client devices for support of Java, Javascript and other web scripting languages by interpreting and replacing the script with HTML tags appropriate for the particular client device type. HTML input forms can be replaced with other HTML tags that provide appropriate prompts to request information and provide an interpretation mechanism for recovering information from the user response.

The above-described server-side control is initiated at the beginning of a user session, as described previously, by identification of the client device type. For client-side control, the REMOTE_ADDR HTTP parameter, which remains unique and unchanged during a session, can be utilized for individual user identification. During a session the user may want to alter the characteristics of the client. For example, a wireless PDA having both a graphical user interface (GUI) and a voice interface could have one mode of operation for hand-held use (e.g., both voice and GUI active) and another mode for use within a car (e.g., voice-only mode). Another possible mode is use of only the GUI, e.g., in meetings where voice interaction would be inappropriate. In the voice-only mode, the voice output can be enhanced to compensate for the lack of visual information. Mode characteristics can be predefined before the session, to be used during the session, or can be redefined by the user during the session.

Mode changes can be accomplished via a local client interface or a server callback process in which the user interfaces through the server that calls back to the client to change the mode of the client remotely. Alternatively, the mode can be changed by a predefined schedule that automatically arranges to have the client in the appropriate mode at certain times of the day (e.g., driving to work each day). Mode changes can be recorded at the proxy server in status files or at the client by storing cookies or by Universal Resource Identifier (URI) encoding.

URI encoding is used when the client device cannot support cookies, which is true for many hand-held devices. URI encoding is achieved by appending QUERY_STRING parameters to the URI, which normally comprises five parts:
  protocol://host/path/PATH_INFO?QUERY_STRING.

If the QUERY_STRING already exists, as in the case of a forms request, then the client parameters can be appended to the QUERY_STRING as an additional parameter string using the "&" operator. If the QUERY_STRING is not already present then the client parameters are added using the "?" operator to add a new QUERY_STRING. The interpolating proxy server 102 edits downloaded HTML to add the client parameter string to all URIs that are then sent to the client. Whenever the client makes a URI request, the additional client parameter string is automatically included in the HTTP request to the proxy server 102. The proxy server 102 then strips the client parameter string back off the URI before it is sent by the proxy server to the web server 106 for processing. Upon receiving the content from the web server 106, the proxy server 102 modifies the content according to the current client parameter settings and again adds the client parameter string to all URIs contained in the content as it is being delivered to the client.

The client in the illustrative embodiment should be capable of retaining and implementing interface mode settings or capable of interpreting content mode tags, e.g., of a type that are or can be defined and standardized by the W3C or other standards body. The client parameters include specification of the level of activity for each main input type, such as keyboard, mouse, pen, touch, voice, etc., and each main output type, such as view screen, voice, touch (e.g., vibration for a pager), etc. Alternatively, the proxy server 102 can store some or all of this information on files at the server and URI encode only a parameter file association identifier. This mode of operation is particularly desirable for narrow-band data channels because it reduces the amount of data transmitted per transaction.

A wake-up mechanism may be provided within the interpolating proxy server 102 in order to allow the user to override interface mode settings. Such a mechanism may be needed if the user has disabled all input modes for presentation only. For the voice interface a special key phrase that would not normally be heard by the system, such as "phonebrowser wake up," can be used to reactivate the voice interface. Likewise a special pen gesture input can be used to reactivate that interface. The key phrase for voice interface activation may only be available when all interfaces are disabled to limit the amount of standby computation resource consumption. Once the interface is reactivated, it may be used to reactivate other interfaces as well.

Figure 2:
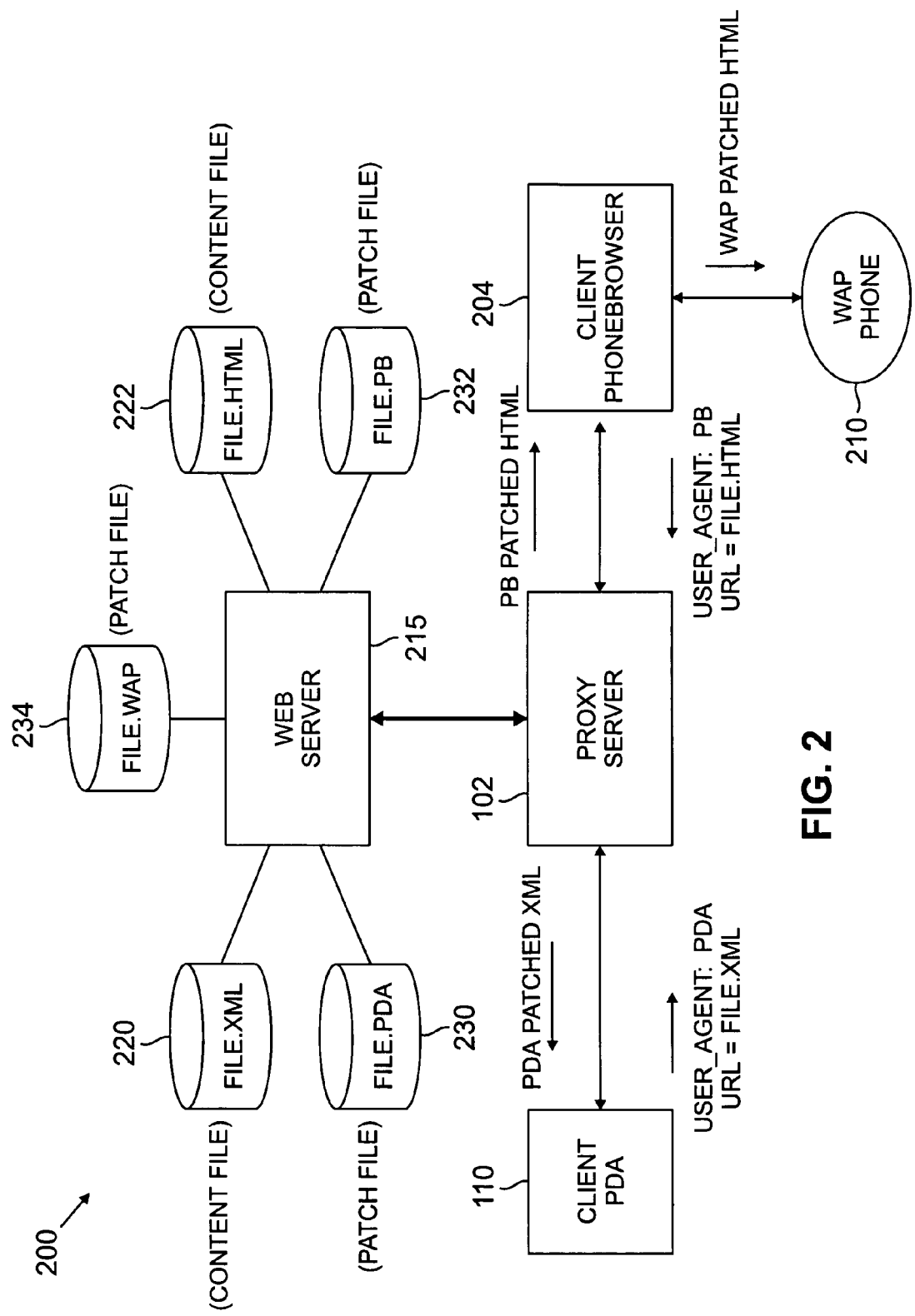
FIG. 2 shows a more detailed view of an illustrative processing system incorporating a content interpolating proxy server in accordance with the invention.

FIG. 2 shows a more detailed diagram illustrating the operation of another embodiment of the invention. This embodiment is in the form of a web-based processing system 200 which includes interpolating proxy server 102 and client PDA device 110. The system also includes a client device 204 in the form of a PhoneBrowser.

The client PhoneBrowser 204 is configured to operate in conjunction with a wireless access M protocol (WAP)-enabled telephone 210. The WAP telephone phone 210 is a terminal device that uses the PhoneBrowser 204 as a speech intermediary server, which in turn uses the interpolating proxy server 102 to interpolate content.

The system 200 further includes a web server 215 which has associated therewith a number of content files and patch files as shown. More particularly, the web server 215 in this embodiment includes content files 220 and 222; containing XML (File.xml) and HTML (File.html) content, respectively, and patch files 230, 232 and 234, containing PDA (File.pda), PhoneBrowser (File.pb) and WAP (File.wap) augmentation or patch files, respectively.

The operation of the system 200 will be illustrated using a number of examples. Assume that a user via PhoneBrowser 204 requests an HTML page from the web server 215. The PhoneBrowser 204 adds its User_Agent identification as a header entry in the corresponding HTTP request and sends this request to the web server 215 via the interpolating proxy server 102. Because the interpolating proxy server 102 sees the request coming from PhoneBrowser 204, it will look not only for the HTML content file requested, but also look for corresponding augmentation file 232 (File.pb) for PhoneBrowser patches to be applied to the HTML content. The patching process implemented by the interpolating proxy server 102 will then replace certain portions of the HTML content with content designed for PhoneBrowser.

As another example, the same user could request web content via the WAP telephone 210. In this case, when an HTML file is requested, the WAP telephone 210 would add its User_Agent identification to the request, and the PhoneBrowser 204 would also add its User_Agent identification to the request. The two identifications may be combined into a composite client identification which the interpolating proxy server 102 can subsequently decode. When the interpolating proxy server 102 sees this composite client identification, it will not only retrieve the requested HTML content file, but will also look for augmentation files for both the PhoneBrowser (File.pb) and the WAP telephone (File.wap) for patches to apply to the content. The patches may have to be applied in some predefined precedence order, or a priority mechanism may be added to determine order of application. The present invention thus provides the user with an ability to control the designation of a "virtual client" type that may be a combination of different sets of features provided by multiple distinct physical client devices, such as the PhoneBrowser 204 and the WAP telephone 210 in the example of FIG. 2.

Figure 3:
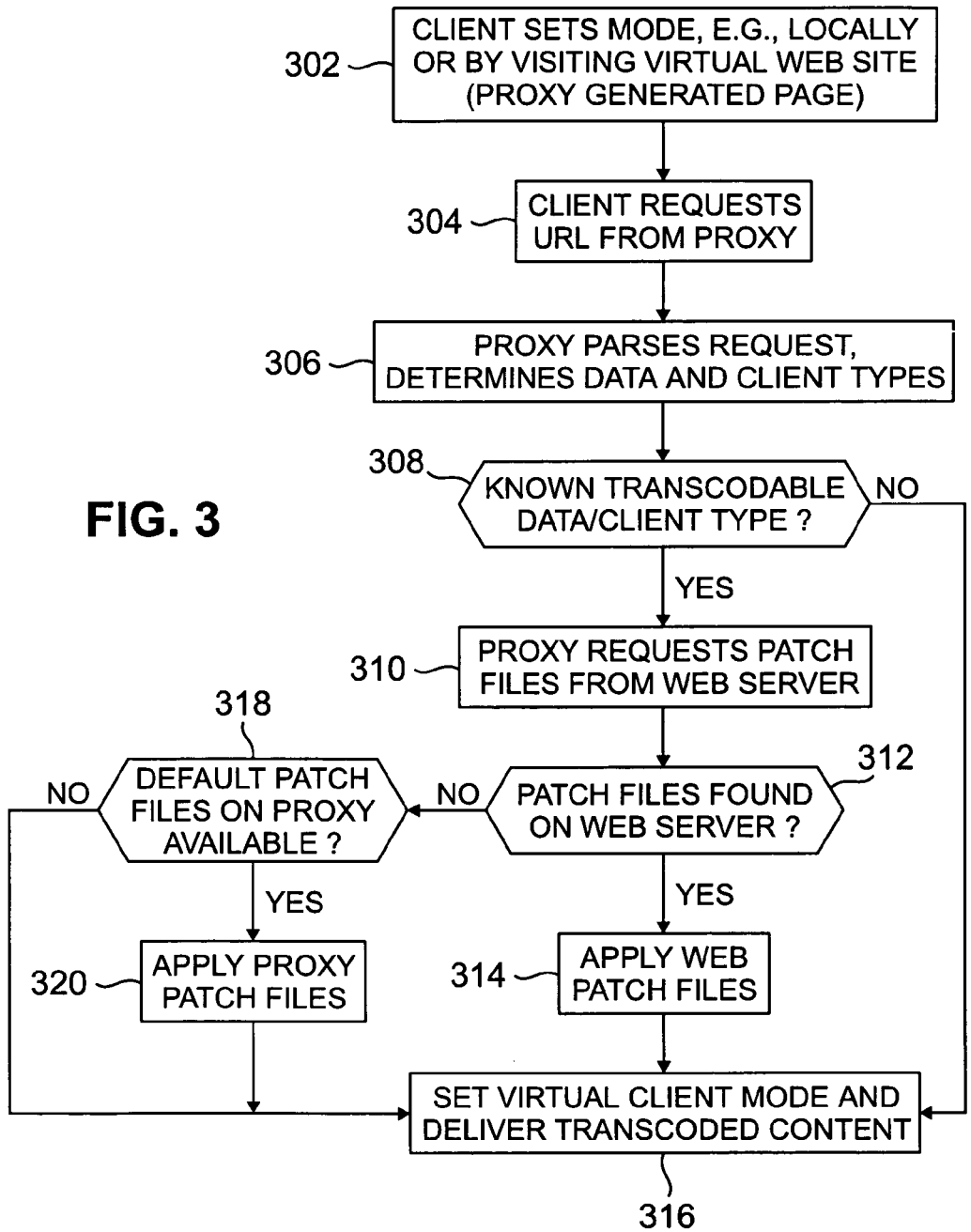
FIG. 3 is a flow diagram illustrating the operation of an example interpolating proxy server in accordance with the invention.

FIG. 3 is a flow diagram showing another example of processing operations that may be implemented in the interpolating web proxy server 102 in accordance with the invention. The web proxy server 102 is also referred to simply as a "proxy" in this example. In step 302, a client sets an operating mode which involves the use of one or more of the above-described features of the interpolating proxy server 102. The client may set this mode, e.g., locally on a corresponding client device, by visiting a virtual web site such as a page generated by the proxy. The client in step 304 then requests a Uniform Resource Locator (URL) from the proxy, e.g., as part of a client request for web content. Alternatively, the request in step 304 may be a request for a URI.

The proxy in step 306 parses the request, and determines the corresponding data and client types. The proxy then determines whether the data and client types associated with the request are known transcodable data and client types. If so, the proxy requests the appropriate patch files from a web server, e.g., the web server 215, in the manner previously described in conjunction with FIG. 2. If it is determined in step 312 that the patch files have been found on the web server, the proxy in step 314 applies the web patch files, and then in step 316 sets the virtual client mode and delivers the resulting transcoded web content to the virtual client. As previously described in conjunction with FIG. 2, the virtual client may correspond to multiple distinct physical devices. If it is determined in step 312 that patch files for the data and client type have not been located, an attempt is made in step 318 to locate default patch files on the proxy. If such default patch files are found, the patch files are applied in step 320, and the process then moves to step 316.

If the proxy in step 308 determines that the data and client types associated with the request are not known transcodable data and client types, or if there are no default patch files available in step 318, the process moves directly to step 316 as shown to set the virtual client mode and deliver transcoded web content.

Although this example utilizes a virtual client mode, i.e., a mode in which the client request is treated by the proxy as originating in a single virtual device incorporating features of multiple distinct physical devices, the processing operations can be altered in a straightforward manner to process requests treated as originating directly from single or multiple physical clients.

It should be understood that the processing operations described in conjunction with FIGS. 1, 2 and 3 are provided by way of illustrative example only, and should not be construed as limiting the invention in any way. Other embodiments of the invention may utilize other processing operations, as will be apparent to those skilled in the art.

The remote content interpolating web proxy server in the above-described illustrative embodiments provides a number of advantages over conventional web proxy servers. For example, the interpolating web server provides multiple interpretations of web content based on client type. In addition, the invention separates the control of interpolation scripts from the proxy server platform so that content providers have full control of all aspects of the web content while not needing control of the interpolating proxy server itself. This allows the interpolating proxy server to be located remotely, e.g., as a generalized service provided by an Internet service provider (ISP) and made simultaneously available to multiple content providers. The interpolating proxy server of the present invention also takes better advantage of semantic information present in the tag names of XML documents as well as other types of ML documents. Furthermore, the invention can be used to perform protocol conversion under the direction of remote interpolation scripts, e.g., to provide service conversion to WAP-enabled devices.

The above-described embodiments of the invention are intended to be illustrative only. Numerous alternative embodiments within the scope of the following claims will be apparent to those skilled in the art.

What is claimed is:

1. An apparatus for use in a computer network, the apparatus comprising:
    at least one server within the network, the server being operative to process a client request generated by a client device to determine a particular client type associated with the client device, to retrieve web content identified in the client request, to retrieve one or more augmentation files associated with at least one of the web content and the particular client type, and to alter the retrieved web content in accordance with the one or more augmentation files, wherein the altered web content is delivered to the client device;
    wherein the server parses the retrieved web content into one or more component structures, and subsequently applies a pattern matching process to recognize designated component structure subject to alteration in accordance with the one or more augmentation files; and
    wherein the pattern matching process comprises comparing a given one of the component structures of the retrieved web content to predetermined component structures represented by respective tokens in the one or more augmentation files.

2. The apparatus of claim 1 wherein the client device comprises at least one of a computer, a personal digital assistant, a wireless telephone and a voice browser-equipped device.

3. The apparatus of claim 1 wherein the web content is at least partially in at least one of an HTML format and an XML format.

4. The apparatus of claim 1 wherein one or more of the augmentation files are co-located with the web content at a site remote from the server.

5. The apparatus of claim 1 wherein at least one of the augmentation files comprises a patch file.

6. The apparatus of claim 1 wherein the server comprises an interpolating web proxy server configured between a device associated with the client and another server which provides the web content identified in the client request.

7. The apparatus of claim 1 wherein the server determines the client type using at least one of an HTTP header element, a client-identifying cookie, and an HTTP GET request QUERY_STRING attribute.

8. The apparatus of claim 1 wherein the pattern matching process utilizes a pattern matching expression comprising context, pattern, precedence and replacement elements.

9. The apparatus of claim 8 wherein the context element comprises a structure scope constraining expression containing one or more instructions of the form pattern:replacement, each specifying a particular replacement from one of the augmentation files to be implemented upon detection of the corresponding pattern.

10. The apparatus of claim 8 wherein the precedence element specifies an order of application of the instructions associated with the context element.

11. The apparatus of claim 1 wherein the received client request is associated with a plurality of different client devices, and the retrieved augmentation files comprise one or more augmentation files for each of the plurality of different client devices.

12. The apparatus of claim 1 wherein at least one of the augmentation files comprises an externally-retrievable augmentation file retrievable from another server external to the at least one server and having at least a portion of the web content associated therewith.

13. An apparatus for use in a computer network, the apparatus comprising:
    at least one server within the network, the server being operative to process a client request generated by a client device to determine a particular client type associated with the client device, to retrieve web content identified in the client request, to retrieve one or more augmentation files associated with at least one of the web content and the particular client type, and to alter the retrieved web content in accordance with the one or more augmentation files, wherein the altered web content is delivered to the client device;
    wherein the client device comprises a virtual client device having a combination of a plurality of different sets of features provided by multiple distinct physical client devices.

14. An apparatus for use in a computer network, the apparatus comprising:
    at least one server within the network, the server being operative to process a client request generated by a client device to determine a particular client type associated with the client device, to retrieve web content identified in the client request, to retrieve one or more augmentation files associated with at least one of the web content and the particular client type, and to alter the retrieved web content in accordance with the one or more augmentation files, wherein the altered web content is delivered to the client device;
    wherein the server processes the client requests such that the request appears to originate from a virtual client device having a combination of a plurality of different sets of features provided by multiple distinct physical client devices.

15. An apparatus for use in a computer network, the apparatus comprising:
    at least one server within the network, the server being operative to process a client request generated by a client device to determine a particular client type associated with the client device, to retrieve web content identified in the client request, to retrieve one or more augmentation files associated with at least one of the web content and the particular client type, and to alter the retrieved web content in accordance with the one or more augmentation files, wherein the altered web content is delivered to the client device;
    wherein the server has access to a set of one or more default augmentation files, and the server is operative to attempt to retrieve a given one of the default augmentation files for use in altering the retrieved web content if the corresponding client request is determined to have no externally-retrievable augmentation files associated therewith.

16. A method for use in a computer network, the method comprising the steps of:
    processing a client request generated by a client device to determine a particular client type associated with the client device;
    retrieving web content identified in the client request;

retrieving one or more augmentation files associated with the web content and the particular client type; and altering the retrieved web content in accordance with the one or more augmentation files;

wherein the altered web content is delivered to the client device; and wherein the retrieved web content is parsed into one or more component structures, and a pattern matching process is subsequently applied to recognize designated component structure subject to alteration in accordance with the one or more augmentation files; and wherein the pattern matching process comprises comparing a given one of the component structures of the retrieved web content to predetermined component structures represented by respective tokens in the one or more augmentation files.

17. A machine-readable medium for storing one or more programs for use in a computer network, wherein the one or more programs when executed by a processing system carry out the steps of:

processing a client request generated by a client device to determine a particular client type associated with the client device;

retrieving web content identified in the client request;

retrieving one or more augmentation files associated with the web content and the particular client type; and altering the retrieved web content in accordance with the one or more augmentation files;

wherein the altered web content is delivered to the client device; and wherein the retrieved web content is parsed into one or more component structures, and a pattern matching process is subsequently applied to recognize designated component structure subject to alteration in accordance with the one or more augmentation files; and wherein the pattern matching process comprises comparing a given one of the component structures of the retrieved web content to predetermined component structures represented by respective tokens in the one or more augmentation files.

18. A processing system comprising:

a web server operative to store web content; and an interpolating proxy server at least temporarily coupled to the web server and operative to process a client request generated by a client device to determine a particular client type associated with the client device, to retrieve web content identified in the client request and stored on the web server, to retrieve one or more augmentation files associated with the web content and the particular client type, and to alter the retrieved web content in accordance with the one or more augmentation files, wherein the altered web content is delivered to the client device;

the interpolating proxy server being further operative to parse the retrieved web content into one or more component structures, and subsequently to apply a pattern matching process to recognize designated component structure subject to alteration in accordance with the one or more augmentation files;

wherein the pattern matching process comprises comparing a given one of the component structures of the retrieved web content to predetermined component structures represented by respective tokens in the one or more augmentation files.

\* \* \* \* \*